United States Patent [19]
Reinhardt

[11] Patent Number: 5,873,460
[45] Date of Patent: Feb. 23, 1999

[54] HIGH DENSITY POLYSTYRENE SPACERS FOR STACKING WAREHOUSE MATERIALS

[76] Inventor: Jay A. Reinhardt, 4215 Gopher Cir., Liverpool, N.Y. 13090

[21] Appl. No.: 851,797

[22] Filed: May 6, 1997

[51] Int. Cl.$^6$ .................................................... B65G 19/18
[52] U.S. Cl. ........................ 206/321; 414/789.5; 206/821
[58] Field of Search ............................ 108/901; 206/321, 206/499, 821; 414/789.5

[56] References Cited

U.S. PATENT DOCUMENTS

| | | | |
|---|---|---|---|
| 2,271,470 | 1/1942 | Youngfelt et al. | 206/321 X |
| 2,271,488 | 1/1942 | Nold | 206/321 X |
| 3,337,174 | 8/1967 | Kreibaum | 206/321 |
| 3,338,542 | 8/1967 | Meinhard | 248/345.1 |
| 4,240,557 | 12/1980 | Dickens | 108/901 X |
| 4,435,463 | 3/1984 | Roellchen | 428/158 |
| 4,610,355 | 9/1986 | Maurer | 206/386 |
| 4,892,193 | 1/1990 | Thomas | 206/453 |
| 4,927,023 | 5/1990 | Elzey | 206/523 |
| 5,352,064 | 10/1994 | Carruthers et al. | 405/229 |

FOREIGN PATENT DOCUMENTS 2 430 369   3/1980   France ..................................... 206/821

*Primary Examiner*—Janice L. Krizek
*Attorney, Agent, or Firm*—Roylance, Abrams, Berdo & Goodman

[57] ABSTRACT

A material spacer is disclosed for stacking warehouse materials such as sheets of drywall or other construction materials. The material spacer is basically an elongated member formed of an expanded high density polystyrene material having a density of approximately 2.5 to 6.0 pounds per cubic foot. Preferably, the material spacer is a rectangular block-shaped member having first and second ends with a pair of opposed support surfaces extending therebetween. The material spacer is at least approximately four feet in length between the first and second free ends. A black or dark resin is preferably used to form the material spacer. In a first embodiment, the material spacer has parallel support surfaces, while in a second embodiment, the material spacer has its bottom support surface angled to accommodate the slope of the bed or deck of a vehicle, e.g., the deck of a rail car.

13 Claims, 4 Drawing Sheets

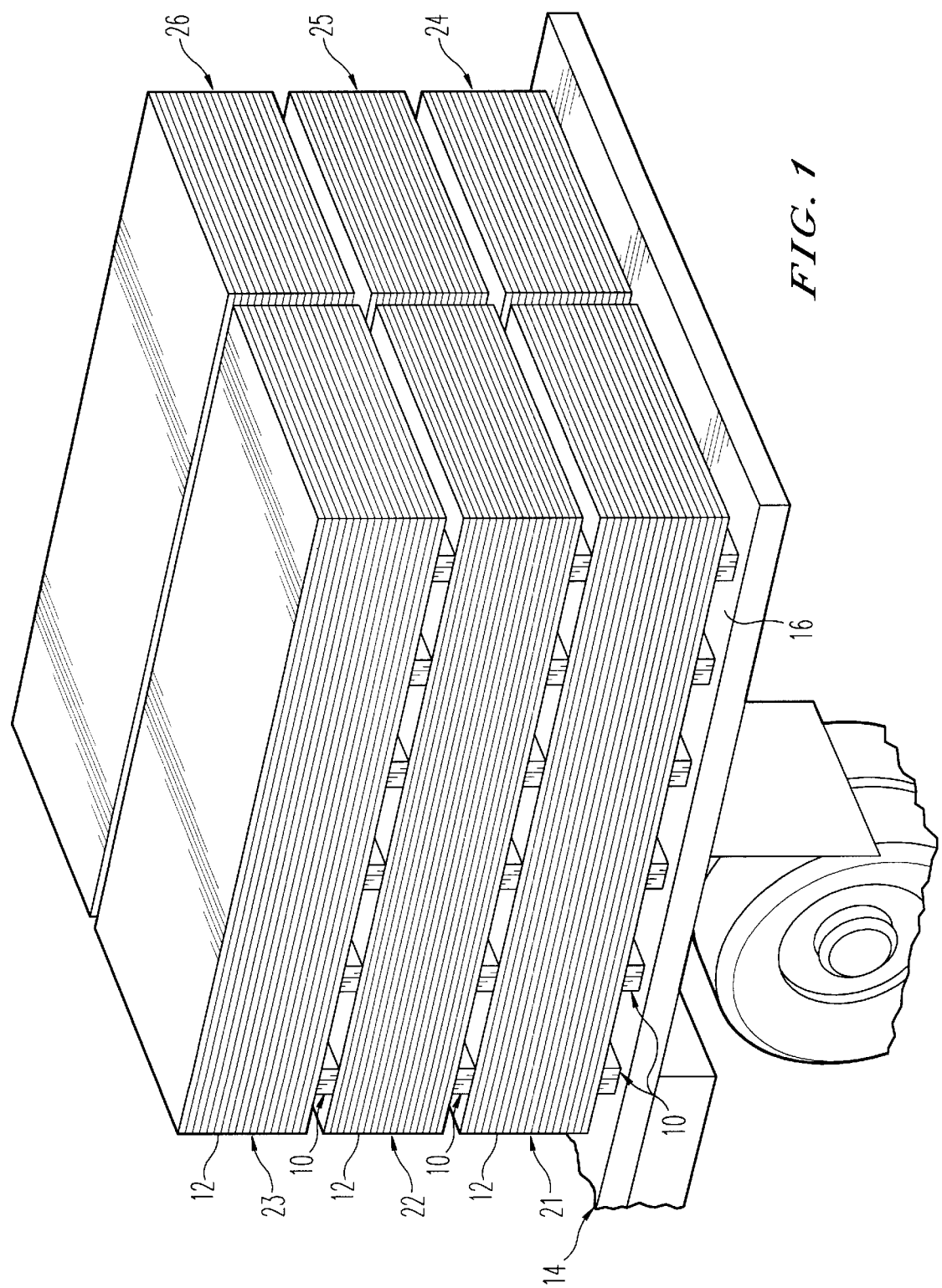

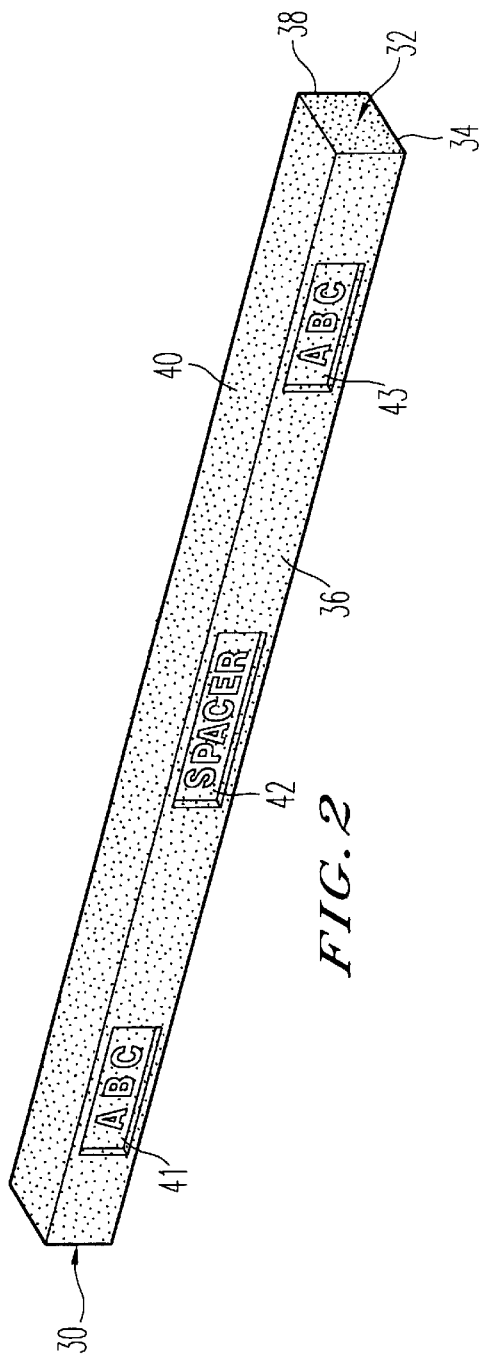
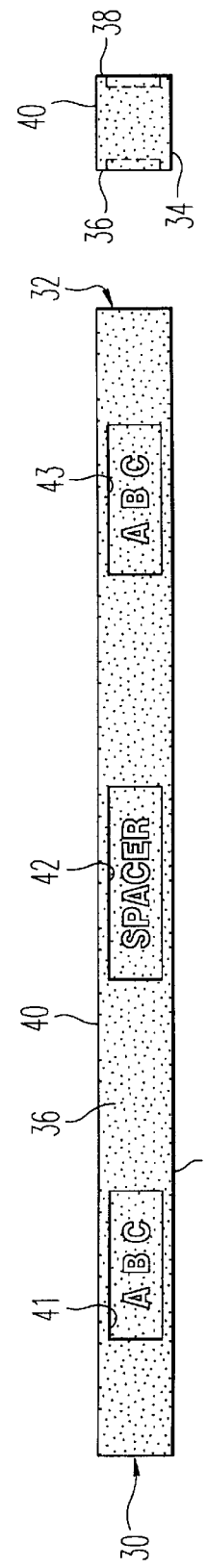
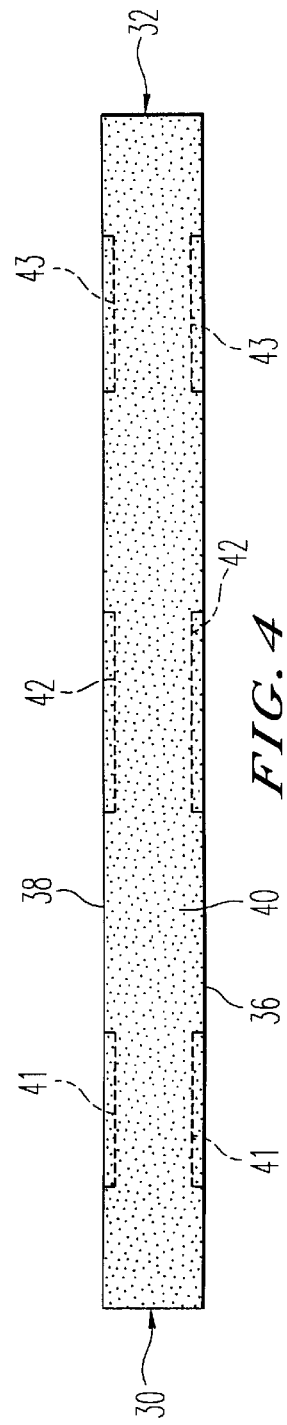
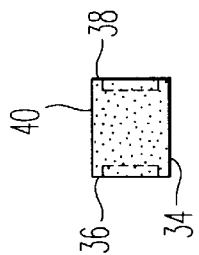

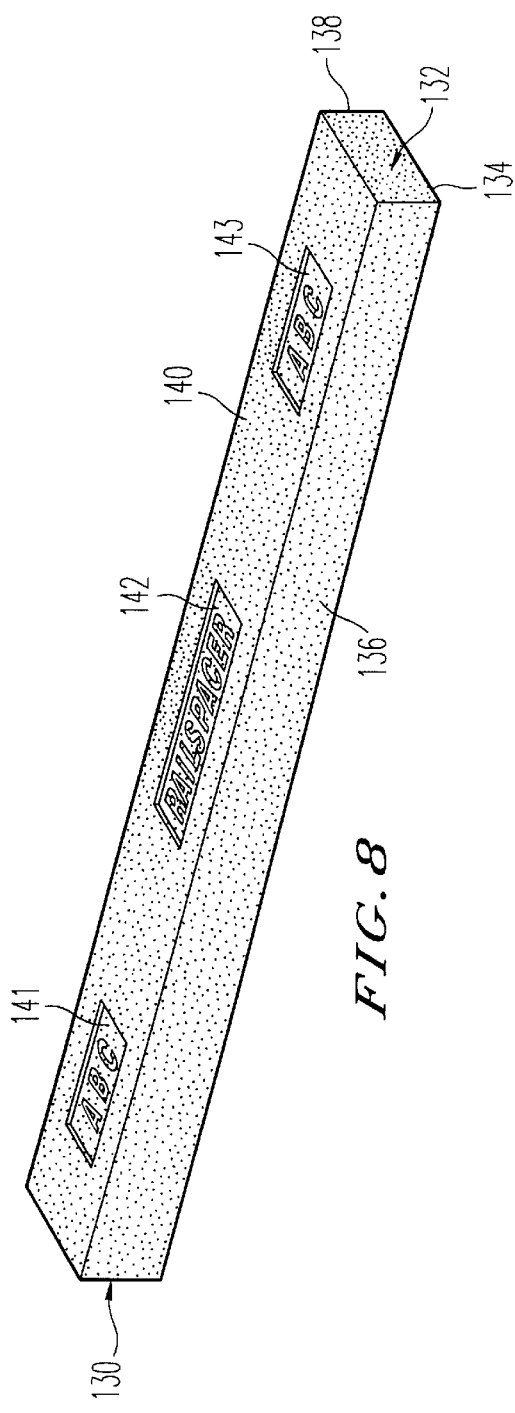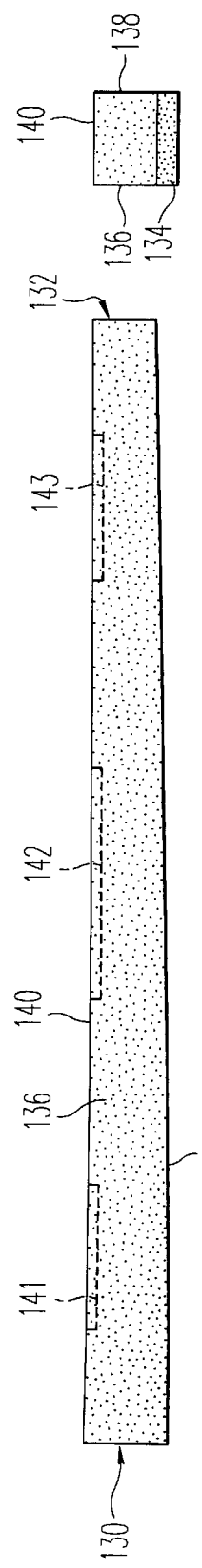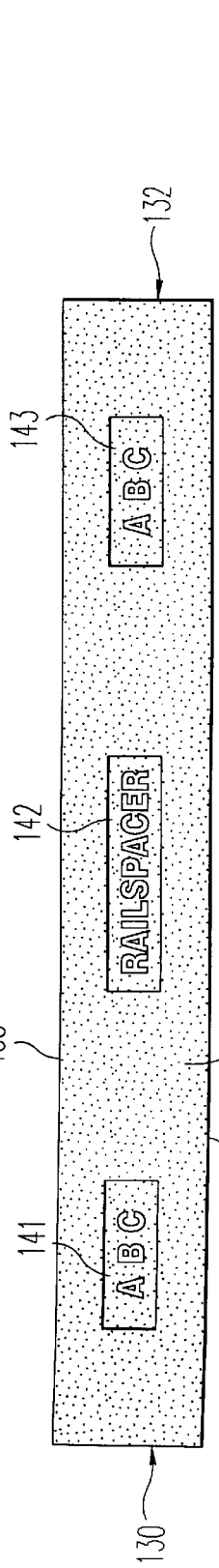

HIGH DENSITY POLYSTYRENE SPACERS FOR STACKING WAREHOUSE MATERIALS

BACKGROUND OF THE INVENTION

Sheet materials in warehouses are typically stacked in piles on wooden pallets or blocks of wood such that the piles of sheet materials can be easily moved with a forklift. Likewise, sheet materials are also transported on wooden pallets or blocks in piles such that the piles can be easily unloaded from a truck, rail car or other vehicle. While wooden pallets and wooden blocks work, they can be quite heavy and cumbersome to handle. Moreover, wooden pallets and wooden blocks are very hard and can damage soft materials such as drywall.

Drywall, which is also known as sheetrock, wallboard or gypsum board is generally produced in sheets, which are approximately four feet wide. The length and thickness of the drywall sheets vary depending upon the particular application. Typically, drywall sheets range from eight feet to twelve feet in length and from ¼ inch to ¾ inch in thickness.

Gypsum wallboard drywall is generally formed of a gypsum material sandwiched between sheets of gypsum paper. Often, two sheets of drywall or wallboards are taped together at their ends for stacking and/or transporting. The sheets of drywall are stacked during shipping and storage on spacers or risers. Currently, sheets of drywall are cut into strips and glued together to form a spacer or risers. These material spacers are typically damaged after a few uses and must be replaced. Of course, this requires new sheets of drywall to be cut up. This constant replacement of spacers can result in a substantial amount of waste and cost.

Examples of various types of prior cushions or spacers for shipping articles are disclosed in the following U.S. Pat. Nos. 3,338,542 to Meinhard; U.S. Pat. No. 4,435,463 to Roellchen; U.S. Pat. No. 4,610,355 to Maurer; U.S. Pat. No. 4,892,193 to Thomas; U.S. Pat. No. 4,927,023 to Elzey; and U.S. Pat. No. 5,352,064 to Carruthers et al. However, none of the devices disclosed in these patents are constructed for supporting sheets of drywall.

In view of the above-mentioned problem, there exists a need for a reusable spacer for stacking and transporting materials such as sheets of drywall. This invention addresses this need in the art as well as other needs which will become apparent to those skilled in the art once given this disclosure.

SUMMARY OF THE INVENTION

One object of the present invention is to provide a reusable and recyclable spacer for stacking and transporting materials, especially sheet materials such as drywall or plywood.

Another object of the present invention is to provide a material spacer which is relatively inexpensive to manufacture.

Yet another object of the present invention is to provide a material spacer that is relatively durable.

The forgoing objects can basically be attained by providing a warehouse material spacer for stacking sheets of material, comprising an elongated member constructed of expanded high density polystyrene having a first free end, a second free end and a pair of opposed surfaces extending between the first and second ends, the elongated member being at least approximately three feet in length between the first and second free ends and having a density of at least approximately 2.5 pounds per cubic foot.

The forgoing objects can also basically be attained by a method of stacking sheet materials, comprising the steps of placing on a support surface a first set of elongated members which are constructed of an expanded high density polystyrene material with a density of at least approximately 2.5 pounds per cubic foot, and having a first free end, a second free end and a pair of opposed surfaces extending between the first and second ends, the first set of elongated members being at least approximately three feet in length between the first and second free ends; arranging the first set of elongated members on the support surface such that the first set of elongated members are substantially parallel to each other; and placing a first set of sheets lengthwise onto the first set of elongated members.

The forgoing method of stacking sheets of drywall can further comprise the steps of placing on the first set of sheets a second set of elongated members which are constructed of an expanded polystyrene material with a density of at least approximately 2.5 pounds per cubic foot, and having first and second free ends with a pair of opposed surfaces extending therebetween, the second set of elongated members being at least approximately three feet in length between the first and second free ends of the second set of elongated members; arranging the second set of elongated members on the first set of sheets such that the second set of elongated members are substantially parallel to each other; and placing a second set of sheets lengthwise onto the second set of elongated members.

Moreover, the above-mentioned objects can be attained by providing a stack of sheets of a construction material, comprising a first set of elongated members of expanded high density polystyrene material having first and second free ends and first and second opposed support surfaces extending between the first and second ends, the first set of elongated members being at least approximately three feet in length between the first and second free ends and having a density of at least approximately 2.5 pounds per cubic foot; and a first set of sheets of construction material positioned lengthwise on the second support surfaces of the first set of elongated members.

Other objects, advantages and salient features of the invention will become apparent from the following detailed description, which, taken in conjunction with the annexed drawings, discloses two preferred embodiments of the present invention.

BRIEF DESCRIPTION OF THE DRAWINGS

Referring now to the attached drawings which form part of this original disclosure:

FIG. 1 is a partial perspective view of a vehicle with sheets of drywall stacked thereon with six spacers positioned between the individual stacks of drywall in accordance with a first embodiment of the present invention;

FIG. 2 is an enlarged perspective view of one of the spacers illustrated in FIG. 1 in accordance with the first embodiment of the present invention;

FIG. 3 is a side elevational view of the spacer illustrated in FIG. 2 in accordance with the first embodiment of the present invention;

FIG. 4 is a top plan view of the spacer illustrated in FIGS. 2 and 3 in accordance with the first embodiment of the present invention;

FIG. 5 is an end elevational view of the spacer illustrated in FIGS. 2–4 in accordance with the first embodiment of the present invention;

FIG. 8 is an enlarged perspective view of one of the bottom material spacers illustrated in FIGS. 6 and 7 in accordance with the second embodiment of the present invention;

FIG. 9 is a side elevational view of the spacer illustrated in FIG. 8 in accordance with the second embodiment of the present invention;

FIG. 10 is a top plan view of the spacer illustrated in FIGS. 8 and 9 in accordance with the second embodiment of the present invention; and FIG. 11 is an end elevational view of the spacer illustrated in FIGS. 8–10 in accordance with the second embodiment of the present invention.

DETAILED DESCRIPTION OF THE PREFERRED EMBODIMENTS

Figure 7:
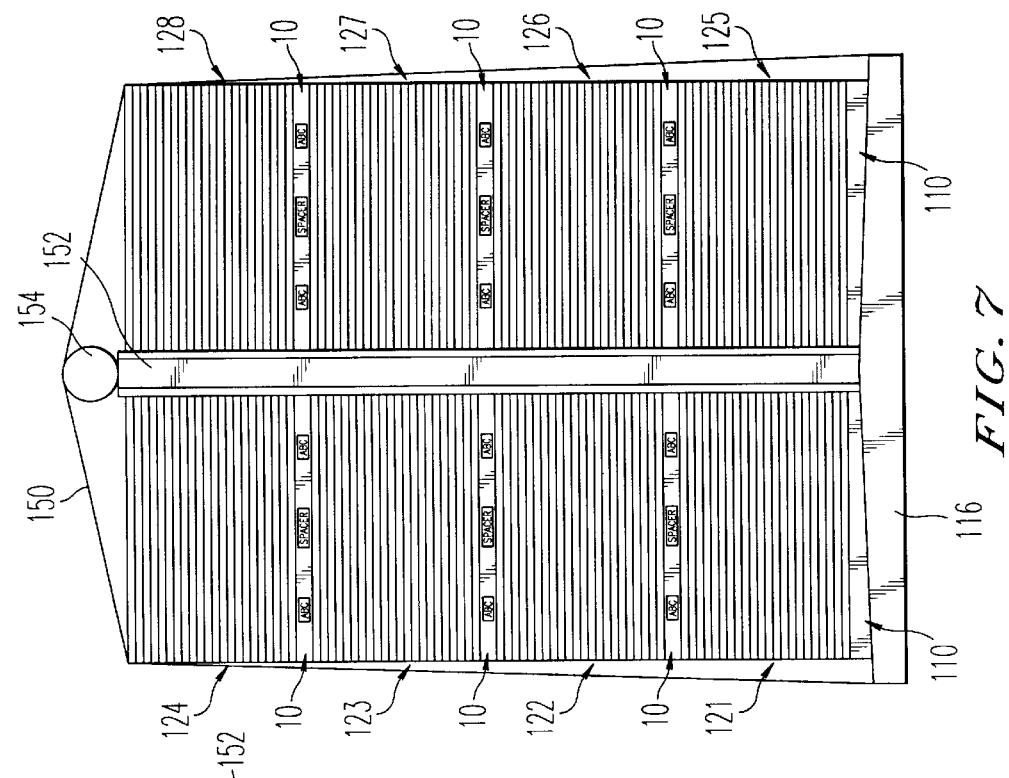
FIG. 7 is an end elevational view of the vehicle illustrated in FIG. 6, with sheets of drywall stacked thereon and with spacers positioned between stacks of drywall.

Referring initially to FIGS. 1–3, a plurality of material spacers 10 in accordance with a first embodiment of the present invention is illustrated for supporting sheets of drywall or gypsum wallboard 12 such that a forklift can lift up the sheets of drywall 12. More specifically, in this embodiment, the sheets of drywall 12 are being stacked upon a vehicle 14 for transporting to a predetermined destination. The vehicle 14 illustrated in FIG. 1 is preferably a conventional truck having a bed 16 with a flat upper support surface for receiving material spacers 10 and the sheets of drywall 12 stacked thereon. Of course, material spacers 10 can be used for other types of sheet materials such as plywood.

Material spacers 10 are constructed of expanded high density polystyrene such that material spacers 10 are relatively durable and reusable. Material spacers 10 are preferably constructed utilizing conventional foam making equipment. Thus, the procedure for manufacturing material spacers 10 will only be briefly discussed herein. The general procedure utilized in manufacturing material spacer 10 involves the following steps. A polystyrene resin is poured into a hopper which feeds to an extruder. A blowing agent is then injected into the extruder to mix with the polystyrene resin. Preferably, the blowing agent is pentane, which makes up approximately three percent of the extruded mixture. The mixture of polystyrene resin and the blowing agent are then subjected to heat, preferably steam, to thoroughly mix the polystyrene resin and the fluid blowing agent into a plastified resin in the form of small beads of polystyrene (impregnated with pentane). The intimate mixture of resin and blowing agent may also contain other conventional additives as needed. Polystyrene beads with three percent pentane can be purchased from Polysourse of Connecticut. Preferably, the polystyrene beads are black so that material spacers 10 have a dark or black appearance.

The polystyrene resin beads are then subjected to steam to expand to approximately 2.5 pounds per cubic foot to approximately 6.0 pounds per cubic foot. Preferably, the beads are expanded to approximately four pounds per cubic foot. In other words, the steam softens the polymer which allows the blowing agent to be released, which in turn increases the volume of the beads. The pressure and temperature during this expansion of the beads are carefully controlled. Also, the beads are constantly being moved to prevent the beads from sticking together. The beads are now cooled and ready for use in the mold. In particular, the expanded beads are now pumped into the cavity of the mold and heated with steam to cause the beads to soften and stick together. Preferably, the mold forms a board of foam. The foam board is now cooled via water. The foam board is then cut with a heated wire into the individual material spacers 10 as illustrated in FIGS. 2–5.

In its finished form, material spacer 10 has a density of approximately 2.5 to 6.0 pounds per cubic foot (preferably approximately 4 pounds per cubic foot) and contains no chlorofluoro carbons (CFC's). Accordingly, material spacers 10 are 100 percent recyclable. Moreover, material spacers 10 with a density of approximately four pounds per cubic foot are able to withstand a greater than 50 psi static load with no more than 10 percent deformation. Moreover, material spacer 10 should have a 100 psi flexural strength or higher at four pounds per cubic foot density.

As seen in FIGS. 1 and 2, six material spacers 10 are utilized to support individual stacks 21–26 of the sheets of drywall 12. More specifically, a first set of material spacers 10 are positioned on the upper support surface of bed 16 for supporting a first set or stack 21 of sheets of drywall 12. The material spacers 10 are arranged parallel to each other on bed 16. Preferably, material spacers 10 are spaced approximately two feet apart.

On the top sheet of the first stack 21 of drywall 12, a second set of six material spacers 10 are arranged thereon. The material spacers 10 are again arranged parallel to each other on stack 21 of sheets of drywall 12 such that the sheets of drywall 12 of stack 22 lie substantially lengthwise on the second set of material spacers 10. Likewise, a third set of six material spacers 10 are arranged on the top sheet of the second stack 22 of drywall 12 for adding the third stack 23 of drywall 12 thereon as seen in FIG. 1. While drywall 12 is only stacked three stacks high, it will be apparent to those skilled in the art that additional stacks can be added on top of the stacks 21–23.

Also, depending upon the size of bed 16 of vehicle 14, additional stacks of drywall 12 can be piled onto bed 16 of vehicle 14. For example, as seen in FIG. 1, a second set of stacks 24–26 are piled on bed 16 of vehicle 14. Stacks 24–26 are piled on vehicle 14 in substantially the same manner as stacks 21–23 as described above. Each of the stacks 21–26 of sheets of drywall 12 can include a total of 26 sheets of drywall 12. Of course, it will be apparent to those skilled in the art once given this disclosure that the number of sheets of drywall 12 in each of the stacks 21–26 can vary depending upon the particular use. Preferably, the material spacers 10 are spaced approximately two feet apart from each other as mentioned above. In FIG. 1, twelve foot sheets of drywall 12 are stacked upon material spacers 10. Of course, the spacing of material spacers 10 will depend upon the number of sheets of drywall 12 in the stack.

Turning now to FIGS. 2–5, one of the material spacers 10 utilized to support the sheets of drywall 12 upon vehicle 14 of FIG. 1 is now illustrated in more detail. In particular, material spacer 10 is illustrated as an elongated member having a substantially rectangular cross-section. Material spacer 10 has a first free end 30, a second free end 32, a first or bottom support surface 34, a pair of side surfaces 36 and 38, and a top support surface 40. In this first embodiment, preferably, bottom support surface 34 and top support surface 40 extend longitudinally between first and second ends 30 and 32 and are substantially parallel to each other. Preferably, bottom and top surfaces 34 and 40 are substantially identical flat surfaces such that material spacer 10 can be utilized either right side up or upside down.

In this embodiment, side surfaces 36 and 38 are preferably flat, planar surfaces which are substantially parallel to each other and are substantially perpendicular to bottom and top support surfaces 34 and 40 as they extend therebetween. Of course, it will be apparent to those skilled in the art that side surfaces 36 and 38 can be angled relative to each other if needed and/or desired. Moreover, preferably one or both of the side surfaces 36 and 38 are provided with recesses 41–43 for containing indicia therein. Recesses 41–43 are utilized to provide information such as the company's name, address, etc. In other words, recesses 41–43 can be utilized for advertising and/or ownership of the material spacer 10.

Each material spacer 10 preferably is approximately 48 inches in length. Of course, it will be apparent to those skilled in the art once given this disclosure that the length of material spacer 10 between first and second free ends 30 and 32 can be a few inches shorter than 48 inches if needed and/or desired. However, it is important that the length of material spacer 10 between first and second free ends 30 and 32 is not substantially smaller than the width of the sheets of drywall 12, since the drywall could become damaged by the material spacer due to the weight of the stack of drywall. Accordingly, the term "at least approximately four feet" as utilized in the appended claims refers to a material spacer of sufficient length and width such that the stack of drywall is not damaged by the material spacer 10. Accordingly, the term "at least approximately four feet" should include a material spacer having a length of 48 inches between its free ends.

Preferably, the width of material spacer 10 between side surfaces 36 and 38 is approximately four inches and the height of material spacer 10 between bottom support surface 34 and top support surface 40 is approximately three inches. Of course, it will be apparent to those skilled in the art from this disclosure that these dimensions can be modified. Of course, it is important that the width of material spacer 10 does not become too narrow causing damage to the sheets of drywall 12. Likewise, the height of material spacer 10 must permit easy insertion of the tines of a forklift beneath the stack of drywall 12.

Alternatively, it will be apparent to those skilled in the art from this disclosure that the height and width of material spacer 10 can be equal so as to have a square cross-section. For example, the height and width could be between three inches to six inches. Preferably, material spacer 10 weighs at least approximately one pound. For example, a three inch by three inch material spacer with a density of four pounds per cubic foot weighs approximately one pound, while a three inch by four inch material spacer with a density of approximately four pounds per cubic foot weighs approximately 1.3 pounds.

Second Embodiment

Figure 6:
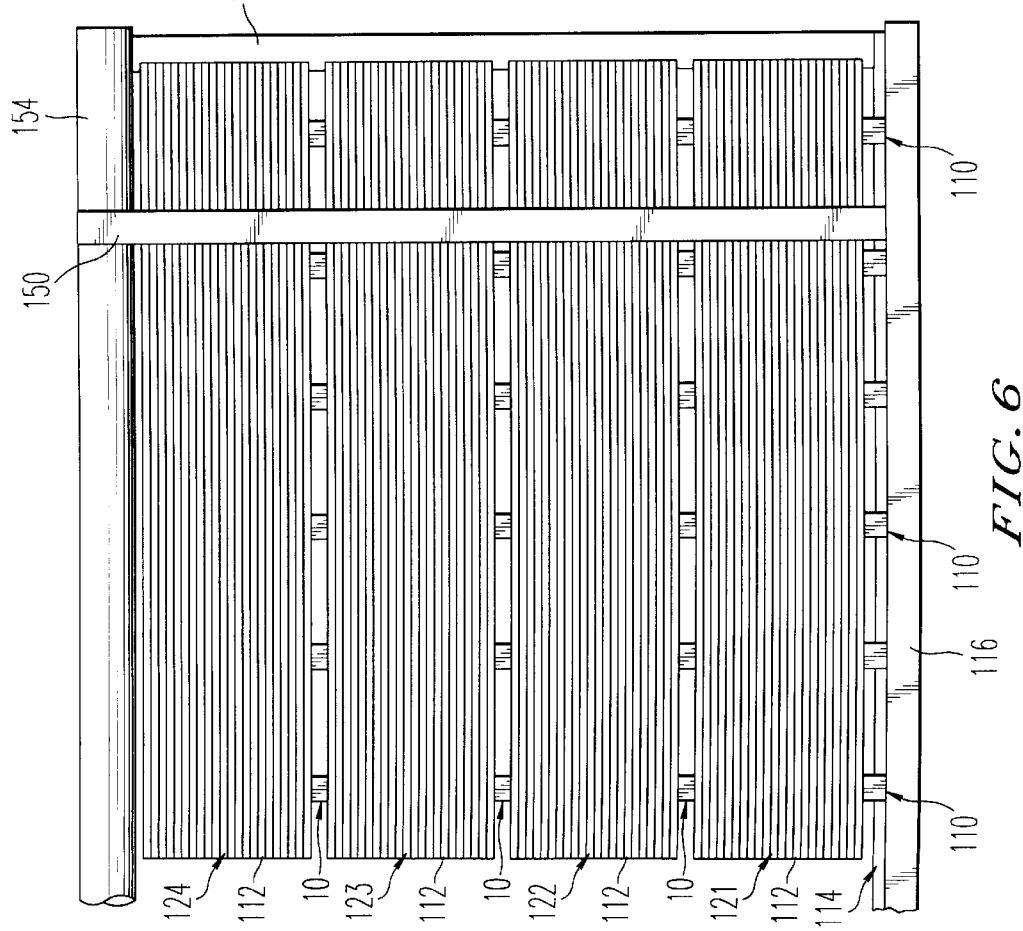
FIG. 6 is a side elevational view of another type of vehicle with sheets of drywall stacked thereon and with six spacers positioned between the individual stacks of drywall in accordance with a second embodiment of the present invention.

Referring now to FIGS. 6–11, a material spacer 110 in accordance with a second embodiment of the present invention is illustrated. More specifically, material spacers 110 are utilized for supporting stacks of drywall 112 on a slanted or sloped surface. For example, as illustrated in FIGS. 6 and 7, the bottom stacks 121 and 125 of drywall 112 are supported on material spacers 110 which engage the slanted or sloped upper surface of deck 116 of rail car 114. Subsequent stacks 122–124 and 126–128 of drywall 112 are supported on material spacers 10, which were previously discussed.

Material spacers 110 are constructed of expanded high density polystyrene in substantially the same manner as material spacers 10, discussed above. Thus, material spacers 110 are relatively durable and reusable. In its finished form, material spacer 110 has a density of approximately 2.5 to 6.0 pounds per cubic foot (preferably 4.0 pounds per cubic foot) and contains no chlorofluoro carbons (CFC's). Accordingly, material spacers 110 are 100 percent recyclable. Moreover, material spacers 110 with a density of at least approximately four pounds per cubic foot are able to withstand a greater than 50 psi static load with no more than 10 percent deformation. Moreover, material spacer 110 should have a 100 psi flexural strength or higher at four pounds per cubic foot density.

As seen in FIGS. 6 and 7, six material spacers 110 are utilized to support the two bottom drywall stacks 121 and 125, while material spacers 10 are used to support drywall stacks 122–124 and 126–128 of the sheets of drywall 112. More specifically, two sets of material spacers 110 are positioned on the upper support surface of bed 116 for supporting stacks 121 and 125 of sheets of drywall. The material spacers 110 are arranged parallel to each other on bed 116. Preferably, material spacers 110 are spaced approximately two feet apart.

On the top sheet of stacks 121 and 125 of drywall 112, a second set of six material spacers 10 are arranged on each of the stacks. The material spacers 10 are again arranged parallel to each other on the stacks 121 and 125 of sheets of drywall 112 such that the sheets of drywall 112 of stacks 122 and 126 lie substantially lengthwise on material spacers 10. Likewise, a third set of six material spacers 10 are arranged on the top sheet of stacks 122 and 126 of drywall 112 for adding stacks 123 and 127 of drywall 112 as seen in FIGS. 6 and 7. The process is repeated for adding stacks 124 and 128 onto stacks 123 and 127. While drywall 112 is only stacked four stacks high, it will be apparent to those skilled in the art that additional stacks 124 and 128 can be added as needed and/or desired.

Preferably, stacks 121–128 of drywall 112 is secured to bed 116 of vehicle 114 via straps 150. A pair of vertical beams 152 (only one shown) together with a cross beam 154 can be used to prevent straps 150 from damaging drywall 112.

Turning now to FIGS. 8–11, one of the material spacers 110 utilized to support the sheets of drywall 112 upon vehicle 114 of FIGS. 6 and 7 is now illustrated in more detail. In particular, material spacer 110 is illustrated as an elongated member having a substantially rectangular cross-section. Material spacer 110 has a first free end 130, a second free end 132, a first or bottom support surface 134, a pair of side surfaces 136 and 138, and a top support surface 140.

Each material spacer 110 preferably is approximately 48 inches in length. Of course, it will be apparent to those skilled in the art once given this disclosure that the length of material spacer 110 between first and second free ends 130 and 132 can be a few inches shorter than 48 inches if needed and/or desired. However, it is important that the length of material spacer 10 between first and second free ends 130 and 132 is not substantially smaller than the width of the sheets of drywall 112, since the drywall could become damaged by the material spacer due to the weight of the stack of drywall. Accordingly, the term "at least approximately four feet" as utilized in the appended claims refers to a material spacer of sufficient length and width such that the stack of drywall is not damaged by the material spacer 110. Accordingly, at least approximately four feet should include a material spacer having a length of 48 inches between its free ends.

In this second embodiment, preferably, bottom support surface 134 and top support surface 140 extend longitudinally between first and second ends 130 and 132. Bottom support surface 134 is slanted to correspond to the slope of bed 116 such that top support surface 140 is substantially level. For example, the height of first end 130 can be approximately 3.5 inches, while the height of second end 132 can be approximately 2.5 inches.

In this embodiment, side surfaces 136 and 138 are preferably flat, planar surfaces which are substantially parallel to each other and are substantially perpendicular to bottom and top support surfaces 134 and 140 as they extend therebetween. Of course, it will be apparent to those skilled in the art that side surfaces 136 and 138 can be angled relative to each other if needed and/or desired. Moreover, preferably one or both of the side surfaces 136 and 138 are provided with recesses 141–143 for containing indicia therein. Recesses 141–143 are utilized to provide information such as the company's name, address, etc. In other words, recesses 141–143 can be utilized for advertising and/or ownership of the material spacer 110.

Preferably, the width of material spacer 110 between side surfaces 136 and 138 is approximately six inches and the height of material spacer 110 between bottom support surface 134 and top support surface 140 is approximately 3.5 inches at first end 130 and approximately 2.5 inches at second end 132. Of course, it will be apparent to those skilled in the art from this disclosure that these dimensions can be modified. Of course, it is important that the width of material spacer 110 does not become too narrow causing damage to the sheets of drywall 112. Likewise, the height of material spacer 110 must permit easy insertion of the tines of a forklift beneath the stack of drywall 112.

Alternatively, it will be apparent to those skilled in the art from this disclosure that the height and width of material spacer 110 can be equal so as to have a square cross-section. For example, the height and width could be between three inches to six inches.

While two advantageous embodiments have been chosen to illustrate the invention, it will be understood by those skilled in the art from this disclosure that various changes and modifications can be made therein without departing from the scope of the invention as defined in the appended claims.

What is claimed is:

1. A stack of sheets of a construction material, comprising:
   a first set of elongated members of expanded high density polystyrene material having first and second free ends and first and second opposed support surfaces extending between said first and second ends, said first set of elongated members being at least approximately three feet in length between said first and second free ends and having a density of at least approximately 2.5 pounds per cubic foot; and
   a first set of sheets of construction material disposed on said second support surfaces of said first set of elongated members.

2. A stack of sheets of construction material according to claim 1, further comprising
   a second set of elongated members of expanded high density polystyrene material having first and second free ends and first and second opposed support surfaces extending between said first and second ends of said second set of elongated members, said second set of elongated members being at least approximately three feet in length between said first and second free ends of said second set of elongated members and having a density of at least approximately 3.5 pounds per cubic foot; and
   a second set of sheets of construction material disposed on said second support surfaces of said second set of said elongated members.

3. A stack of sheets of construction material according to claim 2, wherein
   each of said first and second sets of elongated members has a cross-sectional configuration with a height of at least approximately three inches between said opposed support.

4. A stack of sheets of construction material according to claim 2, wherein
   each of said first and second sets of elongated members has a cross-sectional width of at least approximately three inches.

5. A stack of sheets of construction material according to claim 2, wherein
   said expanded polystyrene materials of each of said first and second sets of elongated members are constructed from a dark resin.

6. A stack of sheets of construction material according to claim 2, wherein
   said opposed support surfaces of each of said first and second sets of elongated members are substantially parallel to each other.

7. A stack of sheets of construction material according to claim 2, wherein
   said opposed support of each of said elongated members of said second set of elongated members are substantially parallel to each other, and said opposed surfaces of each of said elongated members of said first set of elongated members are unparallel to each other.

8. A stack of sheets of construction material according to claim 2, wherein
   said sheets of construction material are drywall sheets.

9. A stack of sheets of construction material according to claim 2, wherein
   said elongated members have a density less than approximately 6.0 pounds per cubic foot.

10. A stack of sheets of construction material according to claim 2, wherein:
    said elongated members of said second set of elongated members are disposed in series along a second direction; and
    said second set of sheets of construction material has a second length, and is disposed on said second support surfaces of said second set of said elongated members such that said second length extends substantially along said second direction.

11. A stack of sheets of construction material according to claim 1, wherein:
    said elongated members of said first set of elongated members are disposed in series along a first direction; and
    said first set of sheets of construction material has a length, and is disposed on said second support surfaces of said first set of elongated members such that said length extends substantially along said first direction.

12. A stack of sheets of construction material according to claim 2, wherein
    said elongated members have a nominal density of approximately 4.0 pounds per cubic foot.

13. A stack of sheets of construction material according to claim 12, wherein
    said elongated materials are approximately four feet in length.

* * * * *